United States Patent
Evans et al.

(10) Patent No.: US 10,225,284 B1
(45) Date of Patent: Mar. 5, 2019

(54) TECHNIQUES OF OBFUSCATION FOR ENTERPRISE DATA CENTER SERVICES

(71) Applicant: Symantec Corporation, Mountain View, CA (US)

(72) Inventors: Nathan S. Evans, Sterling, VA (US); Azzedine Benameur, Fairfax, VA (US); Yun Shen, Bristol (GB)

(73) Assignee: SYMANTEC CORPORATION, Mountain View, CA (US)

( * ) Notice: Subject to any disclaimer, the term of this patent is extended or adjusted under 35 U.S.C. 154(b) by 142 days.

(21) Appl. No.: 14/951,800

(22) Filed: Nov. 25, 2015

(51) Int. Cl.
*G06F 21/56* (2013.01)
*H04L 29/06* (2006.01)
*G06F 21/53* (2013.01)

(52) U.S. Cl.
CPC ......... *H04L 63/1491* (2013.01); *H04L 63/10* (2013.01); *H04L 63/123* (2013.01)

(58) Field of Classification Search
None
See application file for complete search history.

(56) References Cited

U.S. PATENT DOCUMENTS

| | | | | |
|---|---|---|---|---|
| 7,665,134 B1* | 2/2010 | Hernacki | ............... | G06F 21/55 713/161 |
| 8,549,643 B1* | 10/2013 | Shou | ............... | G06F 21/556 455/410 |
| 9,152,808 B1* | 10/2015 | Ramalingam | ........... | G06F 21/62 |
| 2002/0046351 A1* | 4/2002 | Takemori | ............... | G06F 21/55 726/23 |
| 2010/0077483 A1* | 3/2010 | Stolfo | ............... | G06F 21/554 726/24 |
| 2012/0254951 A1* | 10/2012 | Munetoh | ............... | G06F 21/554 726/4 |

OTHER PUBLICATIONS

Identification of Bot Commands by Run-time Execution Monitoring. Park et al. IEEE(2009).*
JP5549810. English Translation. NEC. 2012.*
Honeypot-based Defense System Research and Design. Li-juan. (Year: 2009).*
Comparison of Emprical Data From Two Honeypots and a Distributed Honeypot Network. Bloomfield et al. (Year: 2008).*
Honeyot-based Defense System Research and Design. Li-Juan. (Year: 2009).*
A Big Data Architecture for Large Scale Security Monitoring. Marchal et al. (Year: 2014).*

* cited by examiner

*Primary Examiner* — Venkat Perungavoor
(74) *Attorney, Agent, or Firm* — Maschoff Brennan

(57) ABSTRACT

Techniques of obfuscation for enterprise data center services are disclosed. In one embodiment, the techniques may be realized as a system for obfuscation comprising one or more processors. The one or more processors may be configured to receive a command from at least one of a user and an application and determine whether the command is authorized. If the command is determined to be unauthorized, the one or more processors may be further configured to generate a rewritten output of the command that is different from an original output of the command and return the rewritten output in response to the command.

20 Claims, 4 Drawing Sheets

TECHNIQUES OF OBFUSCATION FOR ENTERPRISE DATA CENTER SERVICES

FIELD OF THE DISCLOSURE

The present disclosure relates generally to data security, and, more particularly, to techniques of obfuscation for enterprise data center services.

BACKGROUND OF THE DISCLOSURE

Attackers against large enterprises typically begin at network edges, such as end-user devices, and move towards data centers, such as web servers or database servers, that are connected to the end user devices by network connections. This kind of network breach is referred to as breach by lateral movements. An attacker may move from a point of incursion to other computers where sensitive data or services are exposed.

For example, a lateral movement by an attacker is possible after the attacker identifies existing network mounts or applications on an end-user device. The attacker may notice that the user connects to a web application that accesses data that the attacker is interested in. The attacker may then move laterally to a web server and compromise the web server. The web server has access to a backend database, which the attacker may identify based on connection information and/or web server configuration. Based on the connection information and/or web server configuration, the attacker may then connect or exploit the backend database server and accesses sensitive data.

In view of the foregoing, it may be understood that there may be significant data security risks associated with attackers' lateral movements.

SUMMARY OF THE DISCLOSURE

Techniques of obfuscation for enterprise data center services are disclosed. In one embodiment, the techniques may be realized as a system for obfuscation comprising one or more processors. The one or more processors may be configured to receive a command from at least one of a user and an application and determine whether the command is authorized. If the command is determined to be unauthorized, the one or more processors may be further configured to generate a rewritten output of the command that is different from an original output of the command and return the rewritten output in response to the command.

In accordance with other aspects of this embodiment, the rewritten output may comprise information of one or more decoy hosts.

In accordance with other aspects of this embodiment, the one or more decoy hosts may be operational.

In accordance with other aspects of this embodiment, the one or more processors may be configured to generate the rewritten output by one of an operating system kernel, an operating system kernel model, or a library hooking.

In accordance with other aspects of this embodiment, the one or more processors may be configured to determine whether the command is authorized based on access rights of a user or an application against a file or a command.

In accordance with other aspects of this embodiment, the command may be network-related.

In accordance with other aspects of this embodiment, the command may be to access a configuration file.

In another embodiment, the techniques may be realized as method for obfuscation. According to the method, a command from at least one of a user and an application may be received. Whether the command is authorized may be determined. If the command is determined to be unauthorized, a rewritten output of the command that is different from an original output of the command may be generated and returned in response to the command.

In still another embodiment, the techniques may be realized as a non-transitory computer readable medium storing a computer-readable program of obfuscation. The program may include computer-readable instructions to receive a command from at least one of a user and an application and computer-readable instructions to determine whether the command is authorized. If the command is determined to be unauthorized, the program may further include computer-readable instructions to generate a rewritten output of the command that is different from an original output of the command and computer-readable instructions to return the rewritten output in response to the command.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION OF EMBODIMENTS

In some embodiments, obfuscation of enterprise data center services disclosed herein includes returning decoy host (e.g., honeypots) information and luring attackers to decoy hosts where attackers can be quarantined and analyzed. Risks to compromised hosts may be mitigated as the attackers move away from the compromised hosts. In addition, since the attackers move to decoy hosts such as honeypots, they can be quarantined and analyzed. Effectively strategies to control and fight the attackers can then be developed through further analyses and interactions with the attackers.

Figure 1:
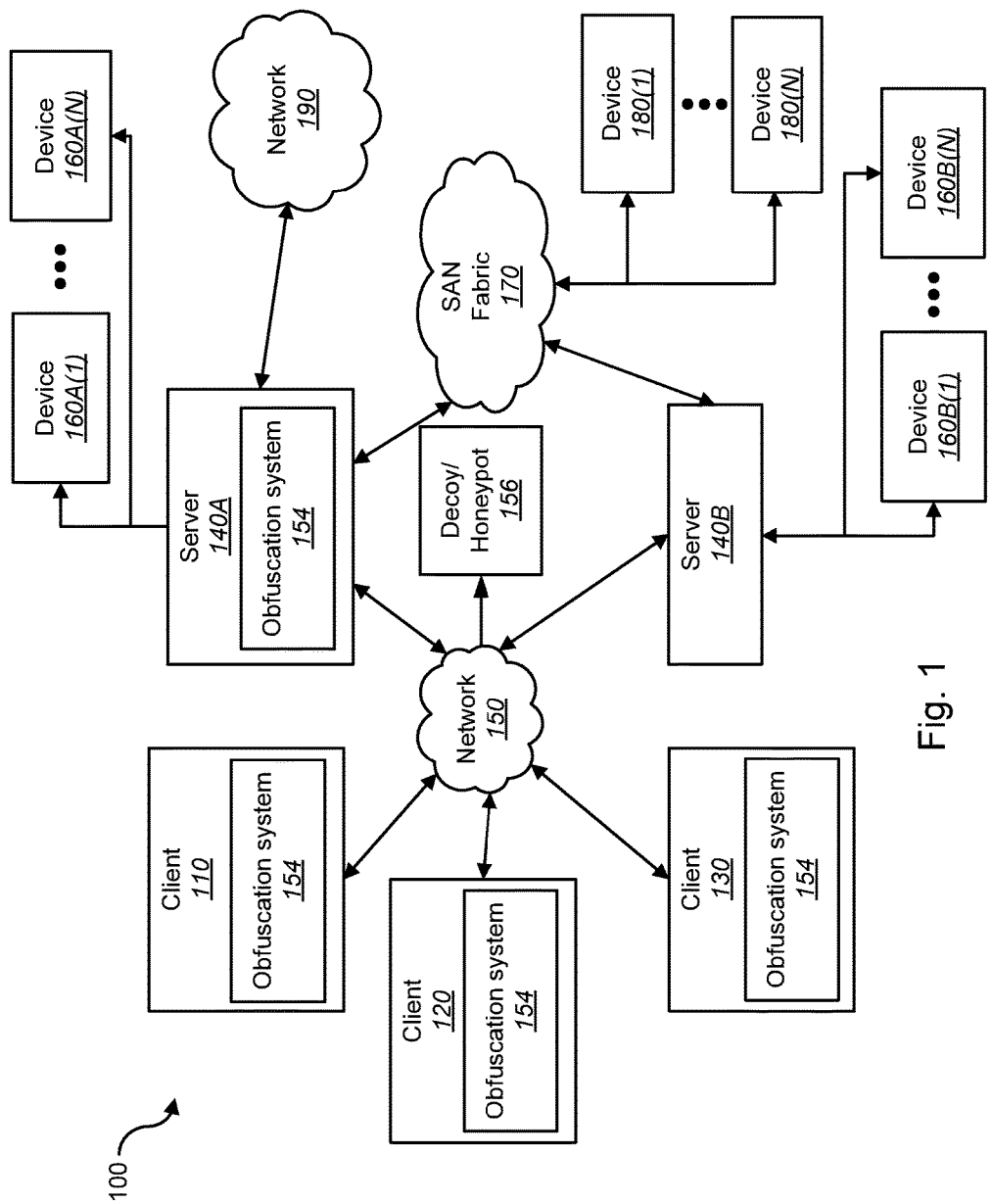
FIG. 1 shows a block diagram depicting a network architecture in accordance with an embodiment of the present disclosure.

FIG. 1 shows a block diagram depicting a network architecture 100 in accordance with an embodiment of the present disclosure. FIG. 1 is a simplified view of network architecture 100, which may include additional elements that are not depicted. Network architecture 100 may contain client systems 110, 120 and 130, as well as servers 140A-140N (one or more of each of which may be implemented using computer system 200 shown in FIG. 2). Client systems 110, 120 and 130 may be communicatively coupled to a network 150. Server 140A may be communicatively coupled to storage devices 160A(1)-(N), and server 140B may be communicatively coupled to storage devices 160B(1)-(N). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150.

Figure 2:
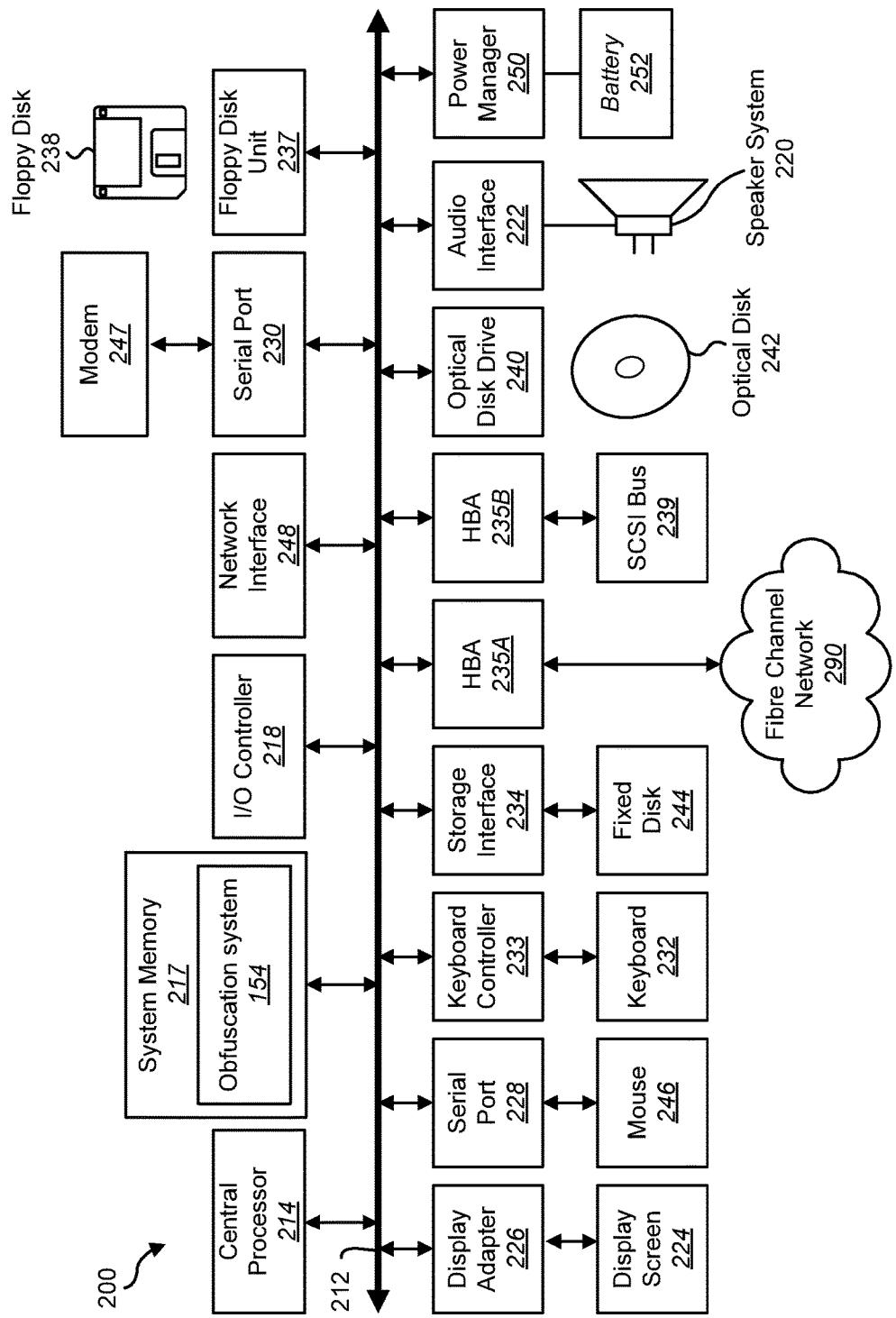
FIG. 2 shows a block diagram depicting a computer system in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may access information on server 140A or 140B using, for example, a web browser or other client software (not shown). Such a client may allow client systems 110, 120 and 130 to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes. Further, storage devices 160A(1)-(N), 160B(1)-(N), and/or 180(1)-(N) may be implemented as part of a multi-tier storage environment.

According to some embodiments, clients 110, 120, and 130 may be smartphones, PDAs, desktop computers, laptop computers, servers, other computers, or other devices coupled via a wireless or wired connection to network 150. Clients 110, 120, and 130 may receive data from user input, a database, a file, a web service, and/or an application programming interface. In some implementations, clients 110, 120, and 130 may specifically be network-capable mobile devices such as smartphones or tablets.

Servers 140A and 140B may be application servers, archival platforms, backup servers, database servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage. According to some embodiments, servers 140A and 140B may be platforms used for backing up and/or archiving data. One or more portions of data may be backed up or archived based on a backup policy and/or an archive applied, attributes associated with the data source, space available for backup, space available at the data source, or other factors.

According to some embodiments, clients 110, 120, and 130 may contain one or more modules for implementation of secure applications such as, for example, obfuscation system 154. Server 140A may include one or more modules such as, for example, obfuscation system 154. Further, one or more portions of the obfuscation system 154 may reside at a network centric location. For example, server 140A may be a server, a firewall, a gateway, or other network element that may perform one or more actions to support management of system and network security elements. According to some embodiments, network 190 may be an external network (e.g., the Internet) and server 140A may be a gateway or firewall between one or more internal components and clients and the external network. According to some embodiments, analysis and approval of resource references including obfuscation system 154 may be implemented as part of a cloud computing environment. For example, obfuscation system 154 may be distributed to various clients and servers through a cloud computer environment. For another example, obfuscation system 154 may be updated at the network centric location and then distributed to various clients and servers.

Decoy/Honeypot 156 may be one or more computer devices that capture and/or analyze attackers. According to some implementations, Decoy/Honeypot 156 may be connected to various clients (e.g., client 110, 120, and 130) and servers (e.g., server 140A). Decoy/Honeypot 156 may be a pure honeypot, a high-interaction honeypot, or a low-interaction honeypot.

FIG. 2 shows a block diagram of a computer system 200 in accordance with an embodiment of the present disclosure. Computer system 200 may be suitable for implementing methods and systems in accordance with the present disclosure. Computer system 200 may include a bus 212 which may interconnect major subsystems of computer system 200, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 200 may be stored on and accessed via a computer readable medium, such as a hard disk drive (e.g., fixed disk 244), an optical drive (e.g., optical drive 240), a floppy disk unit 237, a removable disk unit (e.g., Universal Serial Bus drive), or other storage medium. According to some embodiments, obfuscation system 154 may be resident in system memory 217.

Storage interface 234, as with the other storage interfaces of computer system 200, can connect to a standard computer readable medium for storage and/or retrieval of information, such as a fixed disk drive 244. Fixed disk drive 244 may be a part of computer system 200 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 200 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
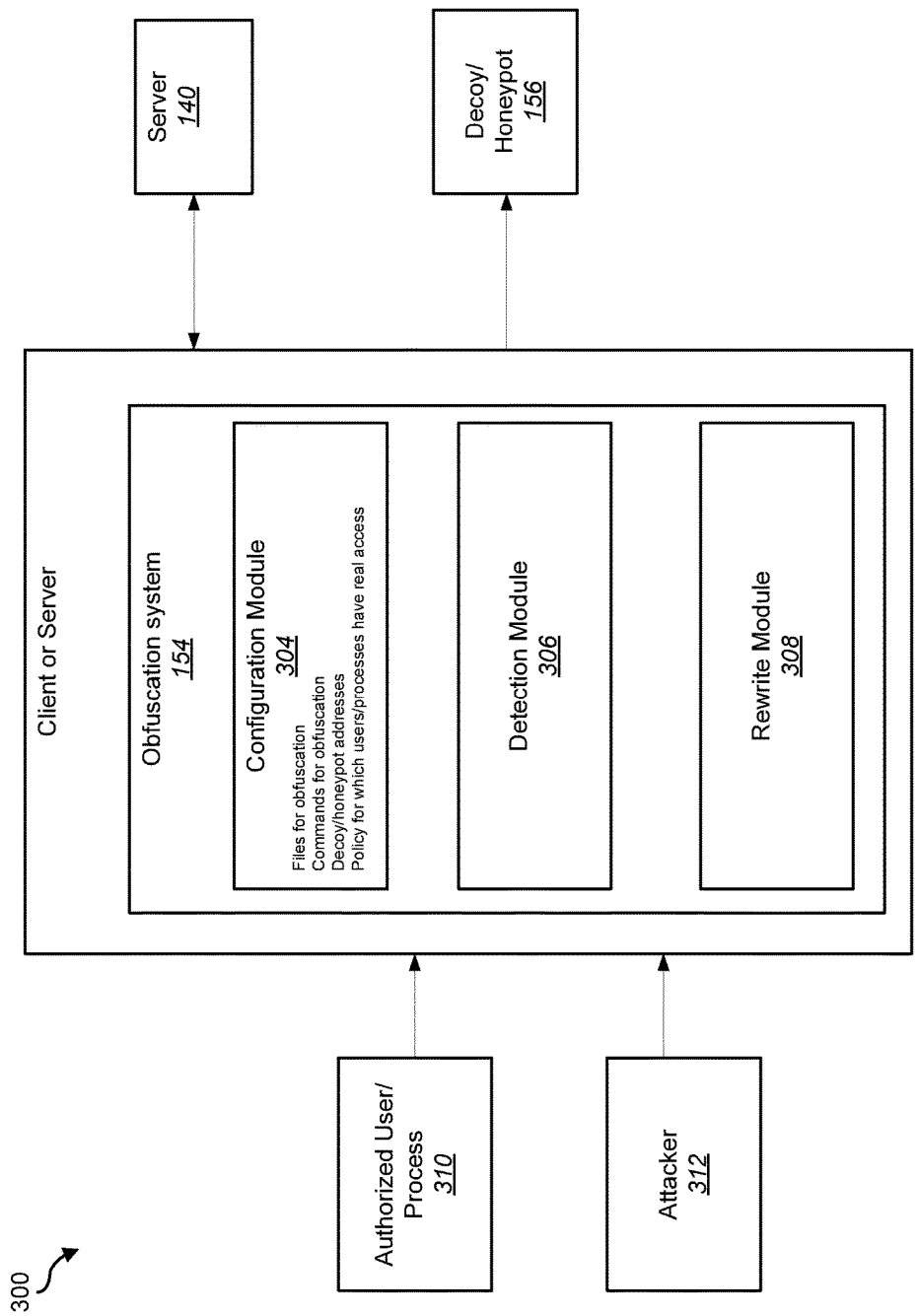
FIG. 3 shows a block diagram illustrating the obfuscation system shown in FIG. 1 in accordance with an embodiment of the present disclosure.

FIG. 3 shows a block diagram illustrating the obfuscation system shown in FIG. 1 in accordance with an embodiment of the present disclosure. Obfuscation module 154 may reside on a client, such as an end-user device, and/or a server, such as a web server. In some embodiments, obfuscation system 154 includes configuration module 304, detection module 306, and rewrite module 308. In some implementations, configuration module 304 specifies access rights of users or processes against certain commands or files. For example, configuration module 304 may specify the files and the commands to be obfuscated. Configuration module 304 may also specify decoy host information, such as IP addresses or database ports for the decoy hosts. In addition, configuration module 304 may have a policy regarding which users or processes have real access. For example, a configuration module may specify that only an Apache process can access the Apache configuration file. Configuration module 304 may store all the above configuration information using various mechanisms, including but not limited to, databases and files. For example, configuration module 304 may use a bar delimited file specifying a user and all the files that the user can access.

Still referring to FIG. 3, in some implementations, detection module 306 may detect whether a user or a process is authorized to execute a command or access a file. Detection module 306 may receive a command from an authorized user/process 310 or an attacker 312 who is not authorized. Detection module 306 may then look up access right information stored by configuration module 304 and determines whether the command is authorized. For example, configuration module 304 may specify that only certain privileged users or an Apache process can access the Apache configuration file. Detection module 306 may receive a command to access the Apache configuration file from a user who is not a privileged user or a process that is not the Apache application. Based on information in configuration module 304, detection module 306 may determine that the command is not authorized. In some implementations, detection module 306 can detect a disguised command from an attacker. For example, if an attacker disguises itself an Apache process, detection module 306 can tell that the command is from the attacker who spawned a process or forked a shell, rather than a true Apache process.

With continued reference to FIG. 3, rewrite module 308 may rewrite an output in response to an unauthorized command. In some implementations, in response to an unauthorized command, common applications for retrieving connection information, such as netstat, ss, and tcpdump, may be modified when invoked to return false information. For example, the IP address of a database server (a.b.c.d) may be replaced with a decoy IP address (w.x.y.z) which may actually be a honeypot. In other implementations, configuration files, such as an Apache configuration file (e.g., httpd.conf) and a MySQL configuration file (e.g., mysql.inc) may be modified to return false information. For example, assume that the connection information for the backend database is located in the file "mysql.inc," which provides the IP address and user/password the client/server host uses to connect to a backend database server. When the attacker accesses the mysql.inc file, the IP address and authentication credentials of the backend database server may be replaced with a decoy IP address and fake credentials. The IP address of the database server a.b.c.d may be replaced with a decoy IP address w.x.y.z which is actually a honeypot; and the user/password may be replaced with the credentials to connect to the honeypot.

In one embodiment, rewrite module 308 may provide a mapping between a real backend server to be protected and a decoy host/honeypot. In response to an unauthorized command, accesses to live network related information may be modified such that the IP for the protected backend server may be replaced with the honeypot IP. Similarly, in response to an unauthorized command, content of a file which contains the IP and credentials of the protected backend server may be replaced with the honeypot IP and credentials. Thus, the honeypot IP and credentials may be consistent across multiple unauthorized commands. Such consistency may induce the attacker to believe it is accessing legitimate data and that the honeypot is the real backend server. For example, in response to an unauthorized netstat command, the honeypot IP w.x.y.z may be returned as a connected host; and in response to an unauthorized command to access the mysql.inc file, the mysql.inc file may contain the honeypot IP w.x.y.z as the backend database server. In some implementations, the honeypot 156 may be an operational host that is connected to the client/server that the attacker is currently on. Believing the honeypot is the real backend server, the attacker may move to the honeypot 156 and/or attempts to log in the honeypot 156, revealing itself.

In some implementations, more than one decoy/honeypots are connected. Depending on the files and/or commands that the attacker tries to access, different but consistent decoy host information may be returned. For example, if the attacker tries to access a backend web server information, a decoy web server IP and credentials may be returned. If the attacker tries to access a backend database, a decoy database server IP and credential may be returned. Different decoy hosts may be equipped with different settings to quarantine and analyze different types of attackers.

In some implementations, obfuscation system 154 may be implemented in an operating system kernel. Accesses to file system or network devices and information may be monitored and the output may be replaced if needed. For example, when a system call is triggered to open (e.g., a system call to open( )) a file by an unauthorized user, a handle may be returned to a similar but modified file with fake data. In some implementations, obfuscation system 154 may be implemented as a kernel module. Functionalities relating to obfuscation may be contained in the module. The module can then be updated as a self-contained unit. In some implementations, obfuscation system 154 may be implemented based on library hooking (e.g., via system wide LD_PRELOAD or library linked at build time) which may intercept library calls (e.g., open( )) and return modified files or data.

For legitimate users and processes, the original output may still be returned so that those legitimate users and processes can access real servers, such as server 140. In some implementations, a software whitelist may be employed to enable legitimate users and processes to access real data and/or servers. On the other hand, unauthorized users and processes may be detected, and attackers may be lured to decoy/honeypot 156.

Figure 4:
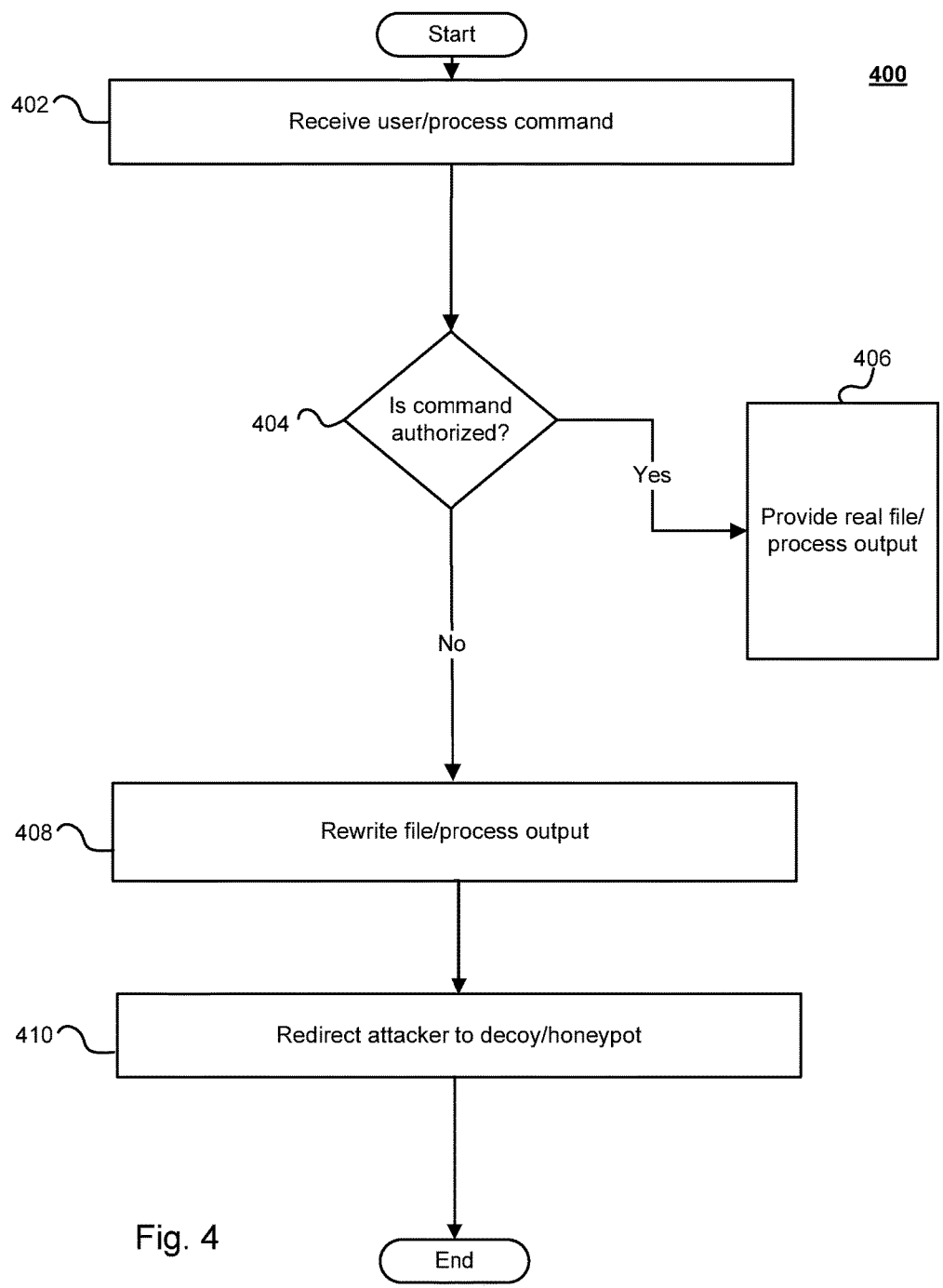
FIG. 4 shows a flowchart for obfuscation of enterprise data center services in accordance with an example method of the present disclosure.

FIG. 4 shows a flowchart for obfuscation of enterprise data center services in accordance with an example method of the present disclosure.

Method 400 may include receiving a user/process command (402), determining if the command is authorized (step 404). If the command is authorized, method 400 may include providing real file/process output (step 406). If the command is unauthorized, method 400 may include rewriting file/process output (step 408) and redirecting an attacker to decoy/honeypot (step 410).

Method 400 may also include receiving a user/process command (402). In some implementations, as described above, the command may be accessing a file that is protected or retrieving network information only certain users, such as administrators, have privileges to (e.g., netstat).

At step 404, the obfuscation system may determine if the command is authorized. In some implementations, the determination may be based on a policy that specifies access rights of users and processes against certain files or commands. For example, a software whitelist may be employed to indicate legitimate applications that are authorized to access certain files or commands.

If the command is determined to be authorized, real file/process output may be returned (step 406). Legitimate users and processes are still able to access real data.

If the command is determined to be unauthorized, file/process output may be rewritten, with output that is different than the original output of an authorized command (step 408). In some implementations, the rewritten output may contain the IP address or port numbers of a decoy/honey pot that is operational and connected to the host where the attacker is currently on, redirecting the attacker to the decoy/honeypot (step 410).

At this point it should be noted that obfuscation for enterprise data center services in accordance with the present disclosure as described above may involve the processing of input data and the generation of output data to some extent. This input data processing and output data generation may be implemented in hardware or software. For example, specific electronic components may be employed in a configuration module, detection model, rewrite model, or similar or related circuitry for implementing the functions associated with obfuscation in accordance with the present disclosure as described above. Alternatively, one or more processors operating in accordance with instructions may implement the functions associated with obfuscation in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A system for obfuscation, comprising one or more computer processors configured to:
receive a first command from at least one of a user and a process to retrieve connection information relating to an IP address of a protected backend database server;
receive a second command from the at least one of a user and a process to access a configuration file containing the IP address of the protected backend database server;

determine that the first and second commands are unauthorized, wherein the determination is based on a policy that specifies user access rights and process access rights;
generate a first rewritten output to the first command, the first rewritten output returning an IP address of a decoy host that is a honeypot;
generate a second rewritten output to the second command, the second rewritten output including a modified configuration file containing the IP address of the decoy host; wherein the IP address of the first rewritten output and the IP address of the second rewritten output are the same;
return the first rewritten output in response to the first command; and
return the second rewritten output in response to the second command.

2. The system of claim 1, wherein the modified configuration file also contains credentials that can be used to connect to the decoy host.

3. The system of claim 1, wherein the decoy host is operational.

4. The system of claim 1, wherein the one or more computer processors are configured to generate the first and second rewritten outputs by one of an operating system kernel, an operating system kernel model, or a library hooking.

5. A computer-implemented method for obfuscation, comprising:
receiving a first command from at least one of a user and a process to retrieve connection information relating to an IP address of a protected backend database server;
receiving a second command from the at least one of a user and a process to access a configuration file containing the IP address of the protected backend database server;
determining that the first and second commands are unauthorized, wherein the determination is based on a policy that specifies user access rights and process access rights;
generating a first rewritten output to the first command, the first rewritten output returning an IP address of a decoy host that is a honeypot;
generate a second rewritten output to the second command, the second rewritten output including a modified configuration file containing the IP address of the decoy host; wherein the IP address of the first rewritten output and the IP address of the second rewritten output are the same;
returning the first rewritten output in response to the first command; and
returning the second rewritten output in response to the second command.

6. The method of claim 5, wherein the modified configuration file also contains credentials that can be used to connect to the decoy host.

7. The method of claim 5, wherein the decoy host is operational.

8. The method of claim 5, wherein the first and second rewritten outputs are generated by one of an operating system kernel, an operating system kernel model, or a library hooking.

9. A non-transitory computer readable medium storing a computer-readable program of obfuscation, comprising:
computer-readable instructions to receive a first command from at least one of a user and a process to retrieve connection information relating to an IP address of a protected backend database server;
computer-readable instruction to receive a second command from the at least one of a user and a process to access a configuration file containing the IP address of the protected backend database server;
computer-readable instructions to determine that the first and second commands are unauthorized, wherein the determination is based on a policy that specifies user access rights and process access rights;
computer-readable instructions to generate a first rewritten output to the first command, the first rewritten output returning an IP address of a decoy host that is a honeypot;
generate a second rewritten output to the second command, the second rewritten output including a modified configuration file containing the IP address of the decoy host; wherein the IP address of the first rewritten output and the IP address of the second rewritten output are the same;
computer-readable instructions to return the first rewritten output in response to the first command; and
computer-readable instructions to return the second rewritten output in response to the second command.

10. The non-transitory computer readable medium according to claim 9, wherein the modified configuration file also contains credentials that can be used to connect to the decoy host.

11. The non-transitory computer readable medium according to claim 9, wherein the decoy host is operational.

12. The non-transitory computer readable medium according to claim 9, wherein the first and second rewritten outputs are generated by one of an operating system kernel, an operating system kernel model, or a library hooking.

13. The system of claim 1, wherein the policy specifies that a web server configuration file may only be accessed by a process performed by the same web server.

14. The system of claim 1, wherein the policy includes a bar delimited file that specifies a user and all the files that the user can access.

15. The method of claim 5, wherein the policy specifies that a web server configuration file may only be accessed by a process performed by the same web server.

16. The method of claim 5, wherein the policy includes a bar delimited file that specifies a user and all the files that the user can access.

17. The non-transitory computer readable medium according to claim 9, wherein the policy specifies that a web server configuration file may only be accessed by a process performed by the same web server.

18. The system of claim 1, wherein the first command is one of a netstat, ss, and tcpdump command and the second command is for access to one of an Apache and MySQL configuration file.

19. The method of claim 5, wherein the first command is one of a netstat, ss, and tcpdump command and the second command is for access to one of an Apache and MySQL configuration file.

20. The non-transitory computer readable medium according to claim 9, wherein the first command is one of a netstat, ss, and tcpdump command and the second command is for access to one of an Apache and MySQL configuration file.

* * * * *